(No Model.)
T. J. SIMPSON.
HORIZONTAL WIND WHEEL.
No. 325,366. Patented Sept. 1, 1885.
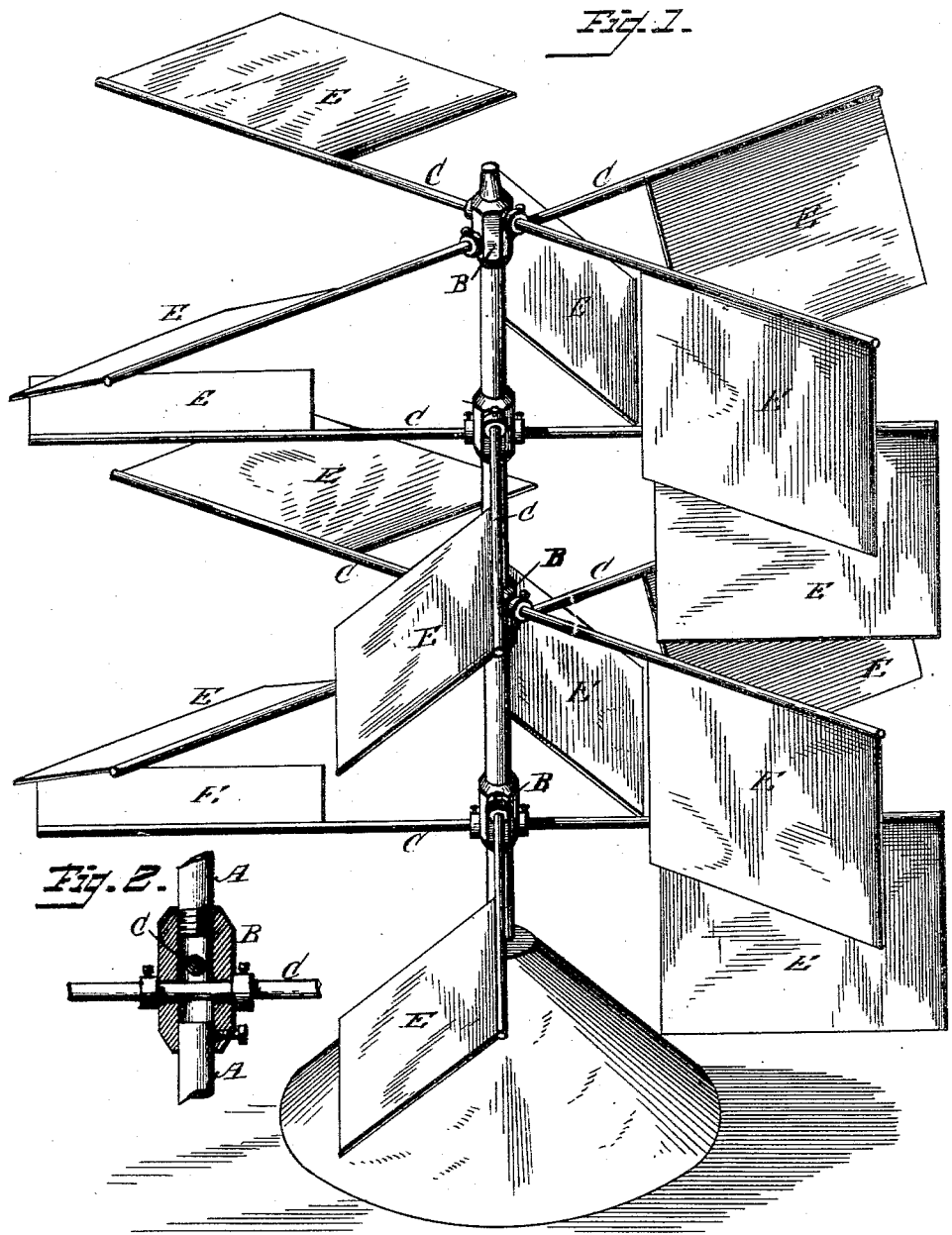
Witnesses
Inventor
Thomas J. Simpson.
By his Attorney

UNITED STATES PATENT OFFICE.

THOMAS J. SIMPSON, OF WORTHINGTON, MINNESOTA.

HORIZONTAL WIND-WHEEL.

SPECIFICATION forming part of Letters Patent No. 325,366, dated September 1, 1885.

Application filed July 3, 1885. (No model.)

*To all whom it may concern:*

Be it known that I, THOMAS J. SIMPSON, a citizen of the United States, residing at Worthington, in the county of Nobles and State of Minnesota, have invented certain new and useful Improvements in Horizontal Wind-Wheels; and I do hereby declare that the following is a full, clear, and exact description of the same, reference being had to the annexed drawings, making a part of this specification, and to the letters and figures of reference marked thereon.

Figure 1 of the drawings is a perspective view of a wind-wheel constructed in accordance with my invention, and Fig. 2 a detail sectional view showing the manner of coupling the sections of shaft.

The present invention has relation to certain new and useful improvements in that class of horizontal wind-wheels in which the upright rotary shaft is provided with radial arms carrying wind-sails arranged at right angles to each other; and the object thereof is to form the shaft in sections, and each section connected to the one above or below it by a suitable coupling, through which loosely pass the horizontal arms carrying the wind-sails, thus forming a series of separate and independent wind-wheels, which may be detached or replaced at pleasure. These objects I attain by the construction substantially as shown in the drawings and hereinafter described and claimed.

In the accompanying drawings, A represents the upright rotary shaft, which is formed in sections, the several sections being connected together by suitable couplings, B. These couplings are preferably formed with interior screw-threads, with which engage the screw-threaded ends of the shaft-sections, as shown in Fig. 2; or, if preferred, the screw-threads may be dispensed with, and the ends of the shaft held in engagement with the couplings by set-screws passing through the same. Any of the usual forms of couplings that will answer the purpose may be used, as I lay no claim to any special manner of connecting the sections together, so long as they make one continuous shaft, and at the same time admit of the sections being readily detached from each other as circumstances require.

The couplings B have arms C passing loosely through holes in the couplings, two or more arms being thus provided for each of the couplings, which have wind-sails E suitably attached to the ends thereof and arranged at right angles to each other. These sails are preferably constructed of metal and attached to the arms along their edges, no part of the sail projecting above the arm to cause back-pressure.

The arms C, which carry the sails E and are supported by the couplings B, I term "a set," and a greater or less number of sets may be used, as found desirable, each being independent of the other. To attain this end the shaft A is formed in detachable sections, as hereinbefore described, so that one or more of these sections, with their couplings and arms carrying the sails, may be removed or a greater number used, thus increasing or diminishing the power of the wheel or adapting it to circumstances.

The arms C may have any number of wind-sails E, and may be connected thereto in any well-known manner.

Having now fully described my invention, what I claim as new, and desire to secure by Letters Patent, is—

A wind-wheel consisting of an upright rotary shaft formed of detachable sections connected together by couplings, and horizontal arms loosely passing through said couplings and carrying wind-sails connected thereto, the sails of each arm being arranged at an angle to each other, substantially as and for the purpose set forth.

In testimony that I claim the above I have hereunto subscribed my name in the presence of two witnesses.

THOMAS J. SIMPSON.

Witnesses:
W. E. STEARNS,
L. W. SEELY.